United States Patent
Chen

(10) Patent No.: US 10,271,524 B2
(45) Date of Patent: *Apr. 30, 2019

(54) SMART PET COLLAR

(71) Applicant: Dongguan Jiasheng Enterprise Co., Ltd., Dongguan OT (CN)

(72) Inventor: Silong Chen, Dongguan (CN)

(73) Assignee: Dongguan Jiasheng Enterprise Co., Ltd., Dongguan (CN)

( * ) Notice: Subject to any disclaimer, the term of this patent is extended or adjusted under 35 U.S.C. 154(b) by 116 days.

This patent is subject to a terminal disclaimer.

(21) Appl. No.: 15/602,533

(22) Filed: May 23, 2017

(65) Prior Publication Data

US 2018/0303070 A1 Oct. 25, 2018

(30) Foreign Application Priority Data

Apr. 19, 2017 (CN) .......................... 2017 1 0255496

(51) Int. Cl.
*A01K 27/00* (2006.01)
*A01K 11/00* (2006.01)

(52) U.S. Cl.
CPC .......... *A01K 27/009* (2013.01); *A01K 11/008* (2013.01); *A01K 27/001* (2013.01); *A01K 27/006* (2013.01)

(58) Field of Classification Search
CPC .. A01K 11/008; A01K 11/006; A01K 27/001; A01K 27/002; A01K 27/006; A01K 27/009

See application file for complete search history.

(56) References Cited

U.S. PATENT DOCUMENTS

| 7,705,736 | B1 * | 4/2010 | Kedziora | A01K 11/008 340/573.3 |
| 8,543,134 | B2 * | 9/2013 | Lopez | A01K 15/021 455/411 |
| 2014/0331942 | A1 * | 11/2014 | Sarazyn | A01K 29/005 119/719 |
| 2015/0099472 | A1 * | 4/2015 | Ickovic | H04B 1/385 455/66.1 |
| 2015/0342149 | A1 * | 12/2015 | Lutz | A01K 27/006 119/859 |

(Continued)

*Primary Examiner* — Trinh T Nguyen
(74) *Attorney, Agent, or Firm* — Wang Law Firm, Inc.

(57) ABSTRACT

A smart pet collar includes a collar body, a hardware holder, and a smart hardware body. The collar body is ring shaped, the hardware holder is locked to the collar body; the smart hardware body is installable into the hardware holder; the hardware holder has a latching element for latching the smart hardware body and a connecting terminal child-and-mother seat configured to be corresponsive to the smart hardware body; and the collar body includes a flexible printed circuit component. The pet collar has the features of powerful function, simple structure, and reasonable design and detachable components to facilitate its use without affecting the pet's wearing comfortability. With the double auxiliary antenna design, the pet collar improves the capability of transmitting/receiving wireless signals, positioning precision and environmental adaptability to meet the requirements for different occasions and environments without increasing the volume or quantity of components of the pet collar.

6 Claims, 7 Drawing Sheets

(56) References Cited

U.S. PATENT DOCUMENTS

| | | | |
|---|---|---|---|
| 2016/0135431 A1* | 5/2016 | Sheldon | H02J 7/0047 |
| | | | 119/859 |
| 2016/0337618 A1* | 11/2016 | Chapman | H04N 7/181 |
| 2017/0135315 A1* | 5/2017 | Marmen | A01K 15/021 |
| 2017/0215386 A1* | 8/2017 | Pianelli | A01K 27/006 |
| 2017/0265432 A1* | 9/2017 | Anderton | G01S 5/02 |
| 2017/0372580 A1* | 12/2017 | Vivathana | G08B 21/0261 |
| 2018/0064068 A1* | 3/2018 | McKee | A01K 27/009 |
| 2018/0110205 A1* | 4/2018 | Czarnecky | A01K 15/021 |
| 2018/0132450 A1* | 5/2018 | Goetzl | A01K 27/009 |
| 2018/0153137 A1* | 6/2018 | Goetzl | A01K 15/022 |
| 2018/0153138 A1* | 6/2018 | Goetzl | A01K 15/022 |
| 2018/0303068 A1* | 10/2018 | Chen | A01K 27/002 |

\* cited by examiner

SMART PET COLLAR

FIELD OF INVENTION

The present invention relates to pet collars, in particular to a smart pet collar worn by pets and having the function of an electronic fence.

BACKGROUND OF INVENTION

1. Description of the Related Art

In general, a pet collar is a device used for protecting, controlling and guiding a pet, and its consumption is very large. Present pet collars just have simple functions and structure and no longer can meet the requirements of practical use. Specifically, there were more than six-million pets (including cats and dogs) were killed in car accidents last years in the United States, and most of the accidents occurred in the dark environment or the condition of insufficient light. In addition, numerous pets were missing or lost in various situations every years, and the chance of finding or getting back these missing or lost pets is very low due to lack of effective pet activity range controls and lost pet recovering measures.

Therefore, related manufacturers manufactured and introduced a smart pet collar into the market. Although the conventional smart pet collars can overcome some of the problems of raising a pet, yet it still has drawbacks and deficiencies on its structure and durability and fails to meet the requirements of practical use.

More specifically, the pet collar requires specialty and variability for different occasions, particularly a very high requirement for antenna to achieve the effect of good communication and positioning, so that the conventional smart pet collar can have good signals and experience in open environment and cannot meet the requirements of actual use.

2. Summary of the Invention

Therefore, it is a primary objective of the present invention to overcome the drawbacks of the prior art and provide a smart pet collar providing the functions of an electronic fence, pet positioning, light reminding, and voice interaction.

To achieve the aforementioned and other objectives, the present invention provides a smart pet collar comprising a collar body, a hardware holder, and a smart hardware body, characterized in that the collar body is substantially ring shaped, the hardware holder is fixed and locked to the collar body, the smart hardware body is installable into the hardware holder, the hardware holder has a latching element for latching the smart hardware body, the hardware holder has a connecting terminal child-and-mother seat installed therein and configured to be corresponsive to the smart hardware body, the collar body includes a flexible printed circuit component clamped therein, the flexible printed circuit device has a plurality of waterproof LED luminous bodies attached thereon and packaged by a resin, the waterproof LED luminous bodies are coupled to the connecting terminal child-and-mother seat through the flexible printed circuit device and the hardware holder, and the smart hardware body includes a housing, a charging port embedded into the housing, and a rechargeable battery, a control circuit board, a speaker, pickup, a GPS module, a Bluetooth module, a mobile network module and a storage module installed in the housing; the speaker, the pickup, the GPS module, the Bluetooth module, and the mobile network module are installed on the control circuit board and coupled to the circuit; the control circuit board is coupled to the rechargeable battery and the charging port; the control circuit board further has a charging circuit corresponsive to the rechargeable battery; the control circuit board further has a SIM card slot provided for inserting a SIM card and connecting the mobile network module; the housing has a hole configured to be corresponsive to the speaker and the pickup; the flexible printed circuit component includes a strip flexible substrate printed on an electrically conductive metal layer of the strip flexible substrate, a thin film layer for sealing the electrically conductive metal layer, a round hole formed at an end of the strip flexible substrate and used as the center for attaching a ring shaped structural reinforcing plate made of a hard material and installing an LED positive electrode circuit contact, an LED negative electrode negative electrode circuit contact, an antenna contact, and a grounding contact; the electrically conductive metal layer is comprised of a plurality of non-contact sections, and one of the sections is coupled to the LED positive electrode circuit contact, and one of the sections is coupled to the LED negative electrode contact, and one of the sections is coupled to the antenna contact, and one of the sections is coupled to the grounding contact, so that the flexible printed circuit device becomes an auxiliary antenna of a GPS module, a Bluetooth module, a mobile network module.

Further, the hardware holder has a honeycomb reinforced structure disposed at the bottom of the hardware holder.

Further, the LED luminous body is a monochromatic lamp bead or a multi-color lamp bead.

Further, the ring shaped structural reinforcing plate has a mating hole formed thereon for connection.

Further, the housing of the smart hardware body has an electrically conductive metal section printed on the inner wall of the housing and coupled to the control circuit board to form an auxiliary antenna of a GPS module, a Bluetooth module, or a mobile network module.

Further, the flexible printed circuit component has a structural reinforcing plate installed on a back side of the flexible printed circuit component where the LED luminous body is situated, and the structural reinforcing plate is provided for preventing the LED luminous body from falling out or separating from the flexible printed circuit device when the flexible printed circuit device is bent or deformed by a force.

In the present invention, the GPS module is provided for positioning a pet, and the GPS function can be used for setting up an electronic fence, so that the pet's activity is restricted within a predetermined area, and when the pet goes beyond the predetermined activity area, the speaker with a light can be used to remind both of the pet and the user, and the pickup and mobile network module can be used to achieve a remote communication between the user and the pet, so as to facilitate the user to issue an instruction from a remote end and understand the dynamic information of the pet.

The smart pet collar of the present invention has the features of powerful function, simple structure, reasonable design, and detachable components to facilitate its use without affecting the pet's wearing comfortability. The detachable structure of the smart pet collar enhances the tensile strength conveniently and independently and the quality of the product and lowers the production cost. With the double auxiliary antenna design, the pet collar improves the capability of transmitting/receiving wireless signals, positioning precision and environmental adaptability to

DESCRIPTION OF THE PREFERRED EMBODIMENTS

The above and other objects, features and advantages of this disclosure will become apparent from the following detailed description taken with the accompanying drawings.

Figure 1:
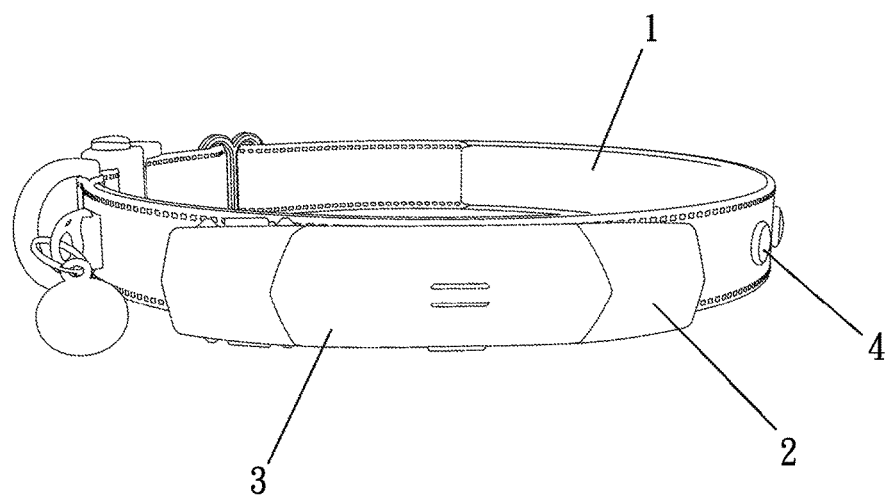
FIG. 1 is a schematic view of a smart pet collar in accordance with a preferred embodiment of the present invention.
Figure 2:
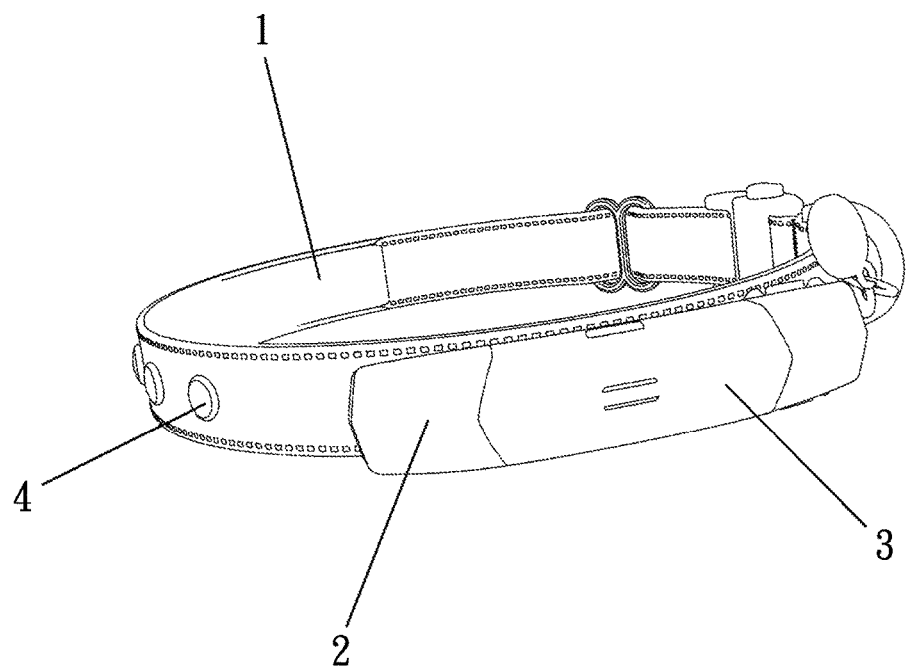
FIG. 2 is another schematic view of a smart pet collar in accordance with a preferred embodiment of the present invention.
Figure 3:
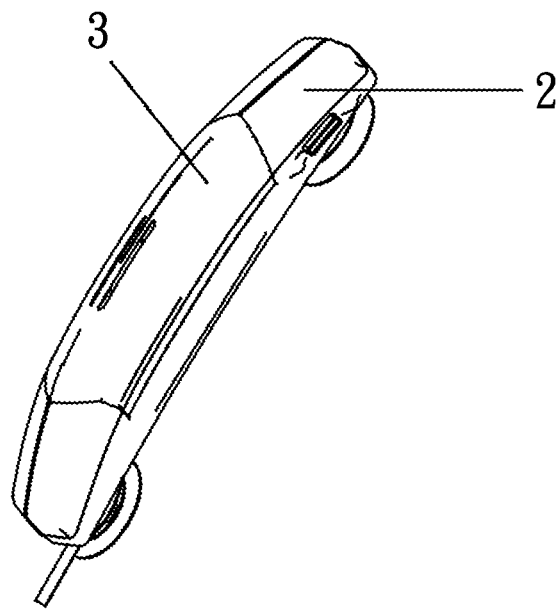
FIG. 3 is a schematic view of a smart hardware body and a hardware holder assembled with each other in accordance with a preferred embodiment of the present invention.
Figure 4:
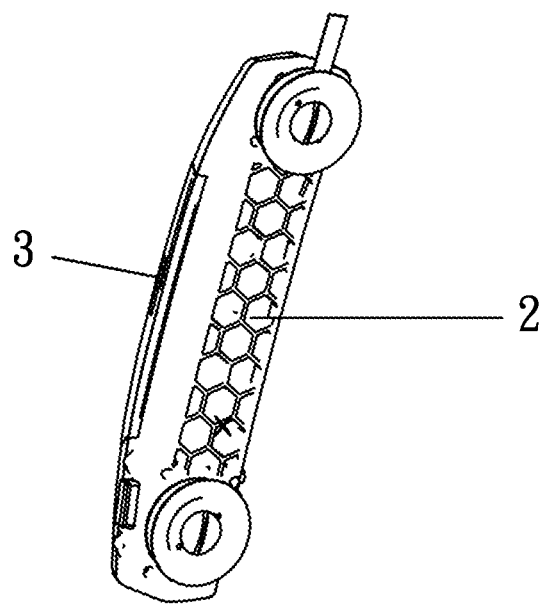
FIG. 4 is another schematic view of a smart hardware body and a hardware holder assembled with each other in accordance with a preferred embodiment of the present invention.
Figure 5:
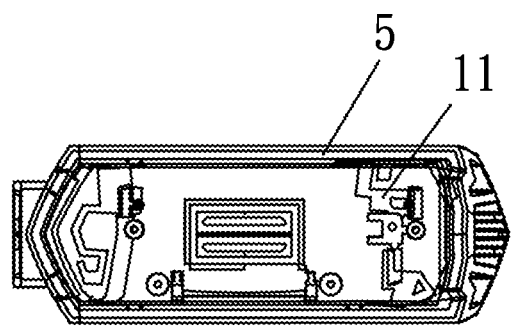
FIG. 5 is a schematic view of a flexible printed circuit component and an LED luminous body assembled with each other in accordance with a preferred embodiment of the present invention.
Figure 6:
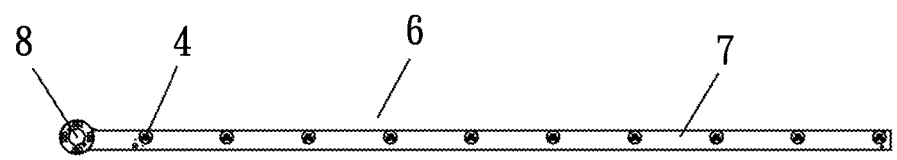
FIG. 6 is a schematic view of the backside of a flexible printed circuit device of the present invention.
Figure 7:
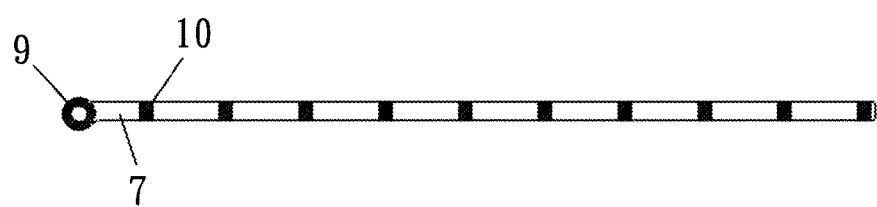
FIG. 7 is a schematic view of an electrically conductive metal section on a housing of a smart hardware body of the present invention.

With reference to FIGS. 1 to 4 for a smart pet collar of a preferred embodiment of the present invention, the smart pet collar comprises a collar body 1, a hardware holder 2, and a smart hardware body 3, characterized in that the collar body 1 is substantially ring shaped, and the hardware holder 2 is fixed and locked onto the collar body 1; the smart hardware body 3 is installable into the hardware holder 2; and the hardware holder 2 has a latching component for latching the smart hardware body 3 and a connecting terminal child-and-mother seat configured to be corresponsive to the smart hardware body 3; the collar body 1 includes a flexible printed circuit component 6 clamped therein; the collar body 1 has a plurality of waterproof LED luminous bodies 4 embedded therein; the waterproof LED luminous bodies 4 are coupled with each other through the flexible printed circuit device 6 and the connecting terminal child-and-mother seat of the hardware holder 2; the smart hardware body 3 includes a housing 5, a charging port formed on the housing 5, and a rechargeable battery, a control circuit board, a speaker, a pickup, a GPS module, a Bluetooth module, a mobile network module, and a storage module installed in the housing 5, and the speaker, the pickup, the GPS module, the Bluetooth module, and the mobile network module are installed on the control circuit board and coupled to a circuit; the control circuit board is coupled to the rechargeable battery and the charging port; the control circuit board further has a charging circuit corresponsive to the rechargeable battery; the control circuit board further has a SIM card slot provided for inserting a SIM card and connecting to the mobile network module; the housing 5 has a mating hole configured to be corresponsive to the speaker and the pickup. The flexible printed circuit component 6 includes a strip flexible substrate 7 printed onto an electrically conductive metal layer of the strip flexible substrate 7 and a thin film layer for sealing the electrically conductive metal layer, and an end of the strip flexible substrate 7 has a round hole 8 whose center is used as the center to attach a ring shaped structural reinforcing plate 9 made of a hard material, and an LED positive electrode circuit contact, an LED negative electrode negative electrode circuit contact, an antenna contact, and a grounding contact are disposed around the center of the round hole 8; the electrically conductive metal layer is comprised of a plurality of non-contact sections, and one of the sections is coupled to the LED positive electrode circuit contact, and one of the sections is coupled to the LED negative electrode contact, and one of the sections is coupled to the antenna contact, and one of the sections is coupled to the grounding contact, so that the flexible printed circuit device 6 becomes an auxiliary antenna of the GPS module, the Bluetooth module, and the mobile network module. The bottom of the hardware holder 2 has a honeycomb reinforced structure. The LED luminous body 4 may be a monochromatic lamp bead or a multi-color lamp bead. The ring shaped structural reinforcing plate 9 has mating hole formed thereon for connection. The smart hardware body 3 has an electrically conductive metal section 11 printed on an inner wall of the housing 5 and provided for connecting the control circuit board to become an auxiliary antenna of the GPS module, the Bluetooth module, and the mobile network module; and the flexible printed circuit component 6 is installed on the LED luminous body 4 and at a position with the structural reinforcing plate 10 on the backside.

While the invention has been described by means of specific embodiments, numerous modifications and variations could be made thereto by those skilled in the art without departing from the scope and spirit of the invention set forth in the claims.

What is claimed is:

1. A smart pet collar, comprising: a collar body, a hardware holder, and a smart hardware body, characterized in that the collar body is substantially ring shaped; the hardware holder is fixed and locked to the collar body; the smart hardware body is installable into the hardware holder; the hardware holder has a latching element for latching the smart hardware body and a connecting terminal child-and-mother seat installed therein and configured to be corresponsive to the smart hardware body; the collar body includes a flexible printed circuit component clamped therein, the flexible printed circuit device has a plurality of waterproof LED luminous bodies attached thereon and packaged by a resin, the waterproof LED luminous bodies are coupled to the connecting terminal child-and-mother seat through the flexible printed circuit device and the hardware holder, and the smart hardware body includes a housing, a charging port embedded into the housing, and a rechargeable battery, a control circuit board, a speaker, pickup, a GPS module, a Bluetooth module, a mobile network module, and a storage module installed in the housing; the speaker, the pickup, the GPS module, the Bluetooth module, and the mobile network module are installed on the control circuit board and coupled to the circuit; the control circuit board is coupled to the rechargeable battery and the charging port; the control circuit board further has a charging circuit corresponsive to the rechargeable battery; the control circuit board further has a SIM card slot provided for inserting a SIM card and connecting the mobile network module; the housing has a hole configured to be corresponsive to the speaker and the pickup; the flexible printed circuit component includes a strip flexible substrate printed on an electrically conductive metal layer of the strip flexible substrate, a thin film layer for sealing the electrically conductive metal layer, a round hole formed at an end of the strip flexible substrate and used as the center for attaching a ring shaped structural reinforcing plate made of a hard material and installing an LED positive electrode circuit contact, an LED negative electrode negative electrode circuit contact, an antenna contact, and a grounding contact; the electrically conductive metal layer is comprised of a plurality of non-contact sections, and one of the sections is coupled to the LED positive electrode circuit contact, and one of the sections is coupled to the LED negative electrode contact, and one of the sections is coupled to the antenna contact, and one of the sections is coupled to the grounding contact, so that the flexible printed circuit device becomes an auxiliary antenna of a GPS module, a Bluetooth module, a mobile network module.

2. The smart pet collar of claim 1, wherein the hardware holder has a honeycomb reinforced structure disposed at the bottom of the hardware holder.

3. The smart pet collar of claim 1, wherein the LED luminous body is a monochromatic lamp bead or a multi-color lamp bead.

4. The smart pet collar of claim 1, wherein the ring shaped structural reinforcing plate has a mating hole formed thereon and provided for connection.

5. The smart pet collar of claim 1, wherein the smart hardware body has an electrically conductive metal section printed on the inner wall of the housing of the smart hardware body and provided for connecting the control circuit board to form an auxiliary antenna of the GPS module, Bluetooth module, or mobile network module.

6. The smart pet collar of claim 1, wherein the flexible printed circuit component has a structural reinforcing plate installed on a back side of the flexible printed circuit component where the LED luminous body is situated, and the structural reinforcing plate is provided for preventing the LED luminous body from falling out or separating from the flexible printed circuit device when the flexible printed circuit device is bent or deformed by a force.

\* \* \* \* \*